US012645296B2

(12) United States Patent
Zhao

(10) Patent No.: US 12,645,296 B2
(45) Date of Patent: Jun. 2, 2026

(54) METHOD AND APPARATUS FOR CONTROLLING BRAIN-COMPUTER INTERFACE DEVICE, AND BRAIN-COMPUTER INTERFACE DEVICE

(71) Applicant: KINGFAR INTERNATIONAL INC., Beijing (CN)

(72) Inventor: Qichao Zhao, Beijing (CN)

(73) Assignee: KINGFAR INTERNATIONAL INC., Beijing (CN)

( * ) Notice: Subject to any disclaimer, the term of this patent is extended or adjusted under 35 U.S.C. 154(b) by 0 days.

(21) Appl. No.: 18/986,621

(22) Filed: Dec. 18, 2024

(65) Prior Publication Data

US 2025/0216942 A1 Jul. 3, 2025

(30) Foreign Application Priority Data

Dec. 29, 2023 (CN) .......................... 202311865582.5

(51) Int. Cl.
*G06F 3/01* (2006.01)
*G06T 7/60* (2017.01)
*G06T 7/73* (2017.01)

(52) U.S. Cl.
CPC ................ *G06F 3/015* (2013.01); *G06T 7/60* (2013.01); *G06T 7/73* (2017.01)

(58) Field of Classification Search
CPC .............. G06F 3/015; G06T 7/60; G06T 7/73
(Continued)

(56) References Cited

U.S. PATENT DOCUMENTS

2020/0004906 A1* 1/2020 Wang ...................... G06F 30/20
2020/0222010 A1 7/2020 Howard
(Continued)

FOREIGN PATENT DOCUMENTS

CN 110442232 A 11/2019
CN 112114662 A 12/2020
(Continued)

OTHER PUBLICATIONS

First Office Action dated Aug. 5, 2025 received in corresponding patent family application No. RU2024138884. English translation attached.
(Continued)

*Primary Examiner* — Calvin C Ma

(57) ABSTRACT

Provided are a method and apparatus for controlling a brain-computer interface device, and the brain-computer interface device. In the method, subsequent to obtaining, by the brain-computer interface device, electroencephalogram data of a user, a multi-modal feature is extracted from the electroencephalogram data and image data displayed by the brain-computer interface device. A fuzzy set corresponding to the multi-modal feature is obtained by the brain-computer interface device based on the multi-modal feature. Further, a control instruction corresponding to the multi-modal feature is obtained by the brain-computer interface device based on the fuzzy set corresponding to the multi-modal feature. The control instruction is executed by the brain-computer interface device, in such a manner that the brain-computer interface device can be controlled based on the electroencephalogram data of the user and the image data displayed by the brain-computer interface device.

17 Claims, 5 Drawing Sheets

(58) Field of Classification Search
USPC .......................................................... 345/156
See application file for complete search history.

(56) References Cited

U.S. PATENT DOCUMENTS

| | | | |
|---|---|---|---|
| 2021/0041953 A1 | 2/2021 | Poltorak | |
| 2021/0325836 A1* | 10/2021 | Sepe .................... | A61B 5/7264 |
| 2022/0095992 A1* | 3/2022 | Guvenc ................ | A61B 5/6868 |
| 2022/0404910 A1 | 12/2022 | Alcaide et al. | |
| 2023/0222454 A1* | 7/2023 | Cella ........................ | G06N 5/01 |
| | | | 705/28 |
| 2024/0285221 A1* | 8/2024 | Korenblum ............ | A61B 5/372 |

FOREIGN PATENT DOCUMENTS

| | | | |
|---|---|---|---|
| CN | 116400802 A | 7/2023 |
| CN | 116909408 A | 10/2023 |
| WO | 2019144019 A1 | 7/2019 |

OTHER PUBLICATIONS

Grant Notice dated Sep. 1, 2025 received in corresponding patent family application No. CN202311865582.5. English translation attached.
Extended European Search Report dated May 14, 2025 received in corresponding European Application No. EP24220183.8.
First Office Action from corresponding Chinese Application No. 202311865582.5, dated Oct. 12, 2024. English translation attached.

\* cited by examiner

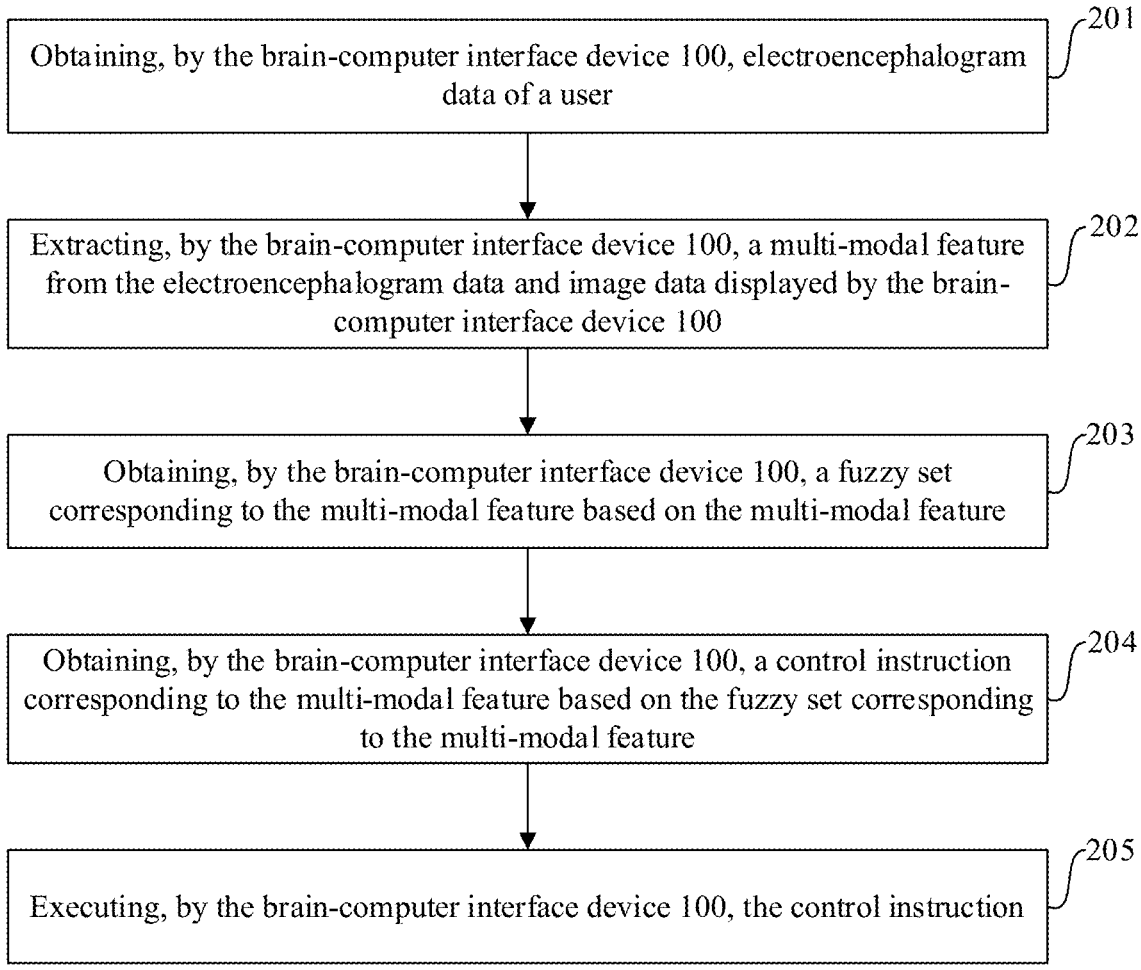

201
Obtaining, by the brain-computer interface device 100, electroencephalogram data of a user 202
Extracting, by the brain-computer interface device 100, a multi-modal feature from the electroencephalogram data and image data displayed by the brain-computer interface device 100

203
Obtaining, by the brain-computer interface device 100, a fuzzy set corresponding to the multi-modal feature based on the multi-modal feature 204
Obtaining, by the brain-computer interface device 100, a control instruction corresponding to the multi-modal feature based on the fuzzy set corresponding to the multi-modal feature 205
Executing, by the brain-computer interface device 100, the control instruction

FIG. 2

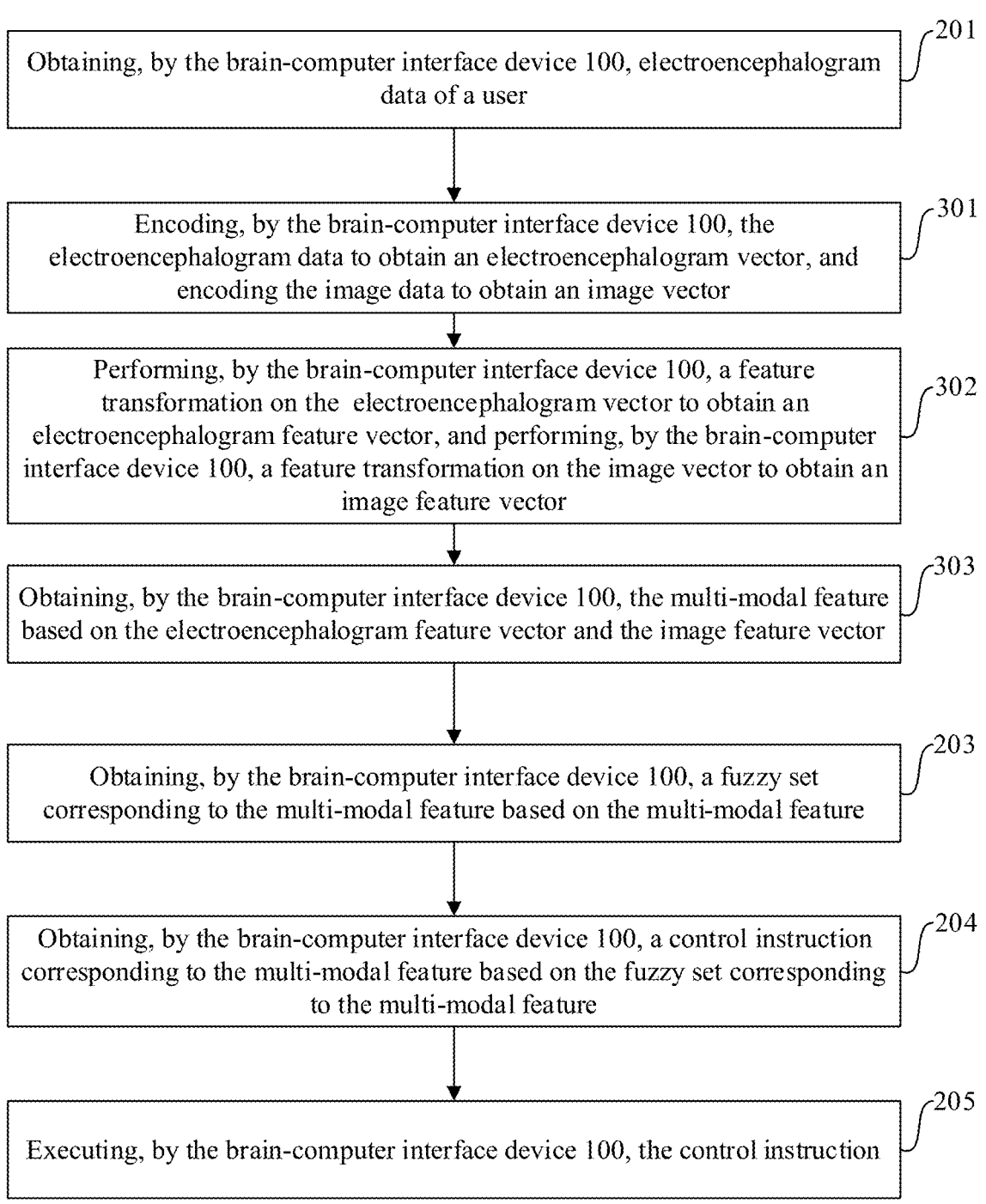

Obtaining, by the brain-computer interface device 100, electroencephalogram data of a user                                                                                  201

Encoding, by the brain-computer interface device 100, the electroencephalogram data to obtain an electroencephalogram vector, and encoding the image data to obtain an image vector                                                 301

Performing, by the brain-computer interface device 100, a feature transformation on the electroencephalogram vector to obtain an electroencephalogram feature vector, and performing, by the brain-computer interface device 100, a feature transformation on the image vector to obtain an image feature vector                                                                                   302

Obtaining, by the brain-computer interface device 100, the multi-modal feature based on the electroencephalogram feature vector and the image feature vector             303

Obtaining, by the brain-computer interface device 100, a fuzzy set corresponding to the multi-modal feature based on the multi-modal feature             203

Obtaining, by the brain-computer interface device 100, a control instruction corresponding to the multi-modal feature based on the fuzzy set corresponding to the multi-modal feature             204

Executing, by the brain-computer interface device 100, the control instruction             205

FIG. 3

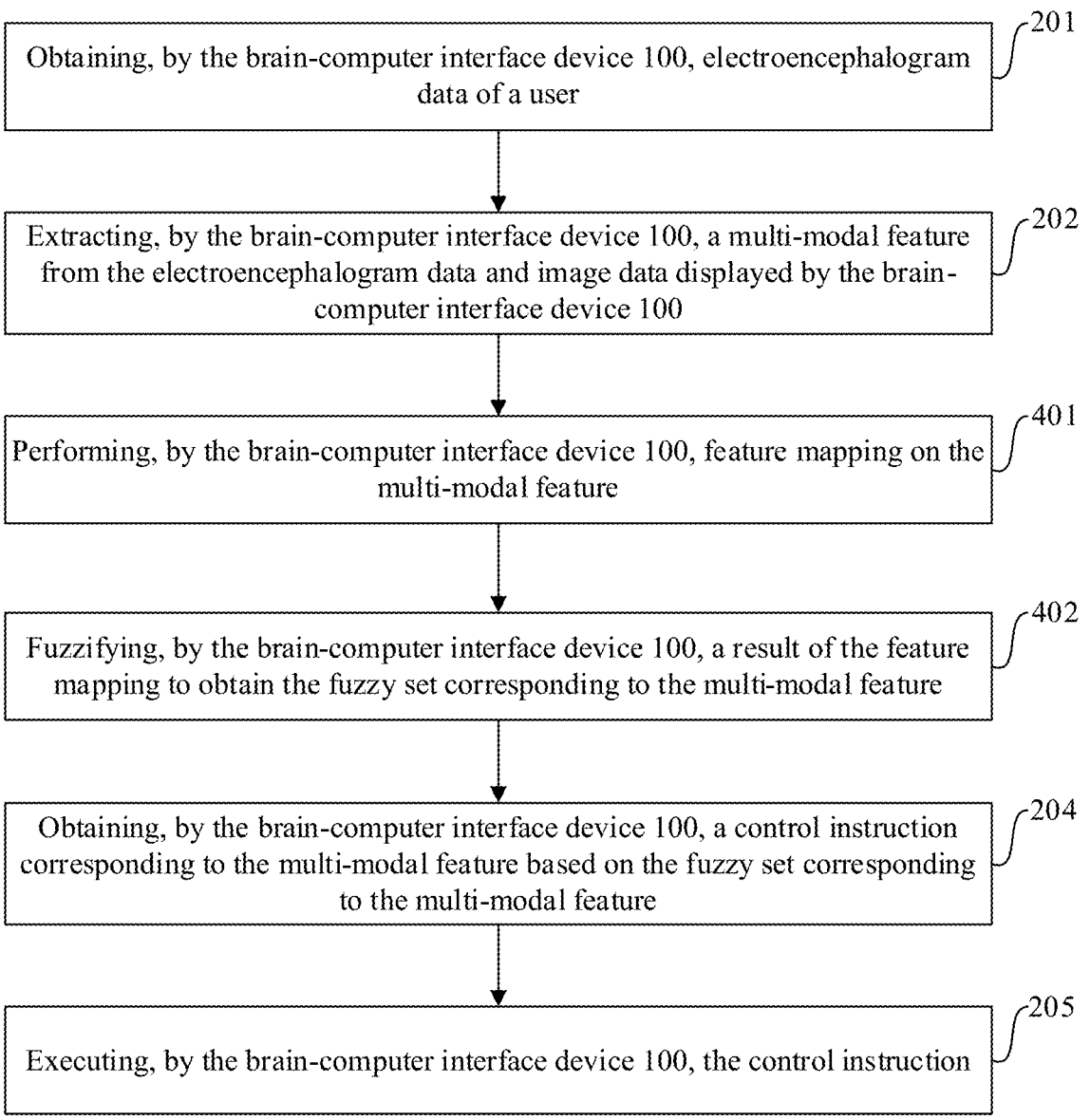

Obtaining, by the brain-computer interface device 100, electroencephalogram data of a user ⌐201

Extracting, by the brain-computer interface device 100, a multi-modal feature from the electroencephalogram data and image data displayed by the brain-computer interface device 100 ⌐202

Performing, by the brain-computer interface device 100, feature mapping on the multi-modal feature ⌐401

Fuzzifying, by the brain-computer interface device 100, a result of the feature mapping to obtain the fuzzy set corresponding to the multi-modal feature ⌐402

Obtaining, by the brain-computer interface device 100, a control instruction corresponding to the multi-modal feature based on the fuzzy set corresponding to the multi-modal feature ⌐204

Executing, by the brain-computer interface device 100, the control instruction ⌐205

FIG. 4

METHOD AND APPARATUS FOR CONTROLLING BRAIN-COMPUTER INTERFACE DEVICE, AND BRAIN-COMPUTER INTERFACE DEVICE

The present application claims priority to Chinese Patent Application No. 202311865582.5, titled "METHOD AND APPARATUS FOR CONTROLLING BRAIN-COMPUTER INTERFACE DEVICE, AND BRAIN-COMPUTER INTERFACE DEVICE", filed on Dec. 29, 2023 with China National Intellectual Property Administration, which is incorporated herein by reference in its entirety.

FIELD

Embodiments of the present disclosure relate to the field of intelligent terminal technologies, and more particularly, to a method and apparatus for controlling a brain-computer interface device and a brain-computer interface device.

BACKGROUND

Virtual reality (VR), as the name implies, is a combination of virtual elements and reality. In theory, VR technology is a computer simulation system that can create a virtual world and enable experience of the virtual world. The VR technology uses a computer to generate a simulated environment into which a user is immersed.

At present, the VR technology is recognized by more and more users. The user can experience the most real feeling through a VR device. The environment simulated by the VR device is so realistic that it is difficult to distinguish the simulated environment from the real world, in such a manner that the user has a feeling of being on the scene. In addition, the user can obtain perceptions such as hearing, vision, touch, taste, and/or smell through the VR device. Finally, the VR device has a super simulation system that truly realizes human-computer interaction, allowing people to operate at will and get the most real feedback of the environment during operation. It is precisely because of existence, multi-perception, interactivity, and other features of the VR device that the VR device is becoming increasingly popular among users.

However, a scheme for controlling the VR device in the related art has problems of unsatisfactory interactivity between the user and the VR device and a weak sense of immersion of the user.

SUMMARY

A method and apparatus for controlling a brain-computer interface device and a brain-computer interface device are provided according to embodiments of the present disclosure. A computer-readable storage medium is further provided according to the embodiments of the present disclosure, to control the brain-computer interface device based on electroencephalogram data of a user and image data displayed by the brain-computer interface device, which improves interactivity between the user and the brain-computer interface device and a sense of immersion of the user, bringing more intelligent control experience to the user.

In a first aspect, a method for controlling a brain-computer interface device is provided according to embodiments of the present disclosure. The method includes: obtaining, by the brain-computer interface device, electroencephalogram data of a user; extracting a multi-modal feature from the electroencephalogram data and image data displayed by the brain-computer interface device; obtaining a fuzzy set corresponding to the multi-modal feature based on the multi-modal feature; obtaining a control instruction corresponding to the multi-modal feature based on the fuzzy set corresponding to the multi-modal feature; and executing the control instruction.

In the above-described method for controlling the brain-computer interface device, subsequent to obtaining, by the brain-computer interface device, the electroencephalogram data of the user, the multi-modal feature is extracted from the electroencephalogram data and the image data displayed by the brain-computer interface device. The fuzzy set corresponding to the multi-modal feature is obtained by the brain-computer interface device based on the multi-modal feature. Further, the control instruction corresponding to the multi-modal feature is obtained by the brain-computer interface device based on the fuzzy set corresponding to the multi-modal feature. The control instruction is executed by the brain-computer interface device, in such a manner that the brain-computer interface device can be controlled based on the electroencephalogram data of the user and the image data displayed by the brain-computer interface device, which improves interactivity between the user and the brain-computer interface device and a sense of immersion of the user, bringing more intelligent control experience to the user.

In a possible implementation, said obtaining the fuzzy set corresponding to the multi-modal feature based on the multi-modal feature includes: performing feature mapping on the multi-modal feature; and fuzzifying a result of the feature mapping to obtain the fuzzy set corresponding to the multi-modal feature.

In a possible implementation, said obtaining the control instruction corresponding to the multi-modal feature based on the fuzzy set corresponding to the multi-modal feature includes: obtaining a relation matrix based on the fuzzy set corresponding to the multi-modal feature and a predetermined control accuracy set; selecting a fuzzy output result from the relation matrix based on a fuzzy membership degree; and obtaining the control instruction corresponding to the multi-modal feature based on the fuzzy output result.

In a possible implementation, said extracting the multi-modal feature from the electroencephalogram data and the image data displayed by the brain-computer interface device includes: encoding the electroencephalogram data to obtain an electroencephalogram vector, and encoding the image data to obtain an image vector; performing a feature transformation on the electroencephalogram vector to obtain an electroencephalogram feature vector, and performing a feature transformation on the image vector to obtain an image feature vector; and obtaining the multi-modal feature based on the electroencephalogram feature vector and the image feature vector.

In a possible implementation, said encoding the electroencephalogram data to obtain the electroencephalogram vector includes: performing a discrete wavelet transform on electroencephalogram data of each channel to obtain a two-dimensional electroencephalogram feature map of each channel; the two-dimensional electroencephalogram feature map of each channel including a time domain feature and a frequency domain feature of each channel; merging obtained two-dimensional electroencephalogram feature maps to obtain a three-dimensional electroencephalogram time-frequency domain feature; performing a feature extraction on the three-dimensional electroencephalogram time-frequency domain feature for each channel to obtain a first deep feature of each channel in a time dimension, and performing a cross-channel feature extraction on the three-dimensional electroencephalogram time-frequency domain feature to obtain a second deep feature between channels in a spatial dimension; and obtaining the electroencephalogram vector based on the first deep feature and the second deep feature.

In a possible implementation, the image data includes local image data which is in an image displayed by the brain-computer interface device and which includes a viewpoint of the user at a current time point. Said encoding the image data to obtain the image vector includes: performing an image preprocessing on the local image data to obtain a viewpoint attention image; extracting a deep feature image from the viewpoint attention image using a base convolutional layer and a deep residual layer; and obtaining the image vector based on the deep feature image.

In a possible implementation, said fuzzifying the result of the feature mapping to obtain the fuzzy set corresponding to the multi-modal feature includes: obtaining an Euclidean distance between the result of the feature mapping and a cluster center corresponding to the result of the feature mapping; discretizing the Euclidean distance to obtain a discrete domain value corresponding to the Euclidean distance; determining a control adjustment amount corresponding to the multi-modal feature based on the discrete domain value corresponding to the Euclidean distance; and obtaining the fuzzy set corresponding to the multi-modal feature based on the control adjustment amount corresponding to the multi-modal feature.

In a second aspect, an apparatus for controlling a brain-computer interface device is provided according to embodiments of the present disclosure. The apparatus is included in the brain-computer interface device and has a function of implementing actions of the brain-computer interface device in the first aspect and the possible implementations in the first aspect. The function may be implemented by hardware, or in a manner of executing corresponding software by hardware. The hardware or software includes one or more modules or units corresponding to the above-described function, e.g., an obtaining module, an extraction module, and an execution module.

In a third aspect, a brain-computer interface device is provided according to embodiments of the present disclosure. The brain-computer interface device includes: one or more processors; a memory; a plurality of application programs; and one or more computer programs stored in the memory and including an instruction. The instruction, when executed by the above-described brain-computer interface device, causes the above-described brain-computer interface device to perform the method in the first aspect.

It should be understood that, technical solutions in the second aspect and technical solutions in the third aspect according to the embodiments of the present disclosure are consistent with technical solutions in the first aspect according to the embodiments of the present disclosure. Advantageous effects obtained by the respective aspects and corresponding feasible embodiments are similar, and thus details thereof will be omitted here.

In a fourth aspect, a computer-readable storage medium is provided according to embodiments of the present disclosure. The above-described computer-readable storage medium has a computer program stored thereon. The computer program, when executed by a computer, causes the computer to perform the method in the first aspect.

In a fifth aspect, a computer program is provided according to embodiments of the present disclosure. The above-described computer program, when executed by a computer, is configured to perform the method in the first aspect.

In a possible design, the program in the fifth aspect may be stored in whole or in part on a storage medium packaged with a processor, or may be stored in part or in whole on a memory not packaged with the processor.

BRIEF DESCRIPTION OF THE DRAWINGS

FIG. 2 is a flowchart of a method for controlling a brain-computer interface device according to an embodiment of the present disclosure.

FIG. 3 is a flowchart of a method for controlling a brain-computer interface device according to another embodiment of the present disclosure.

FIG. 4 is a flowchart of a method for controlling a brain-computer interface device according to yet another embodiment of the present disclosure.

DETAILED DESCRIPTION

Figure 1:
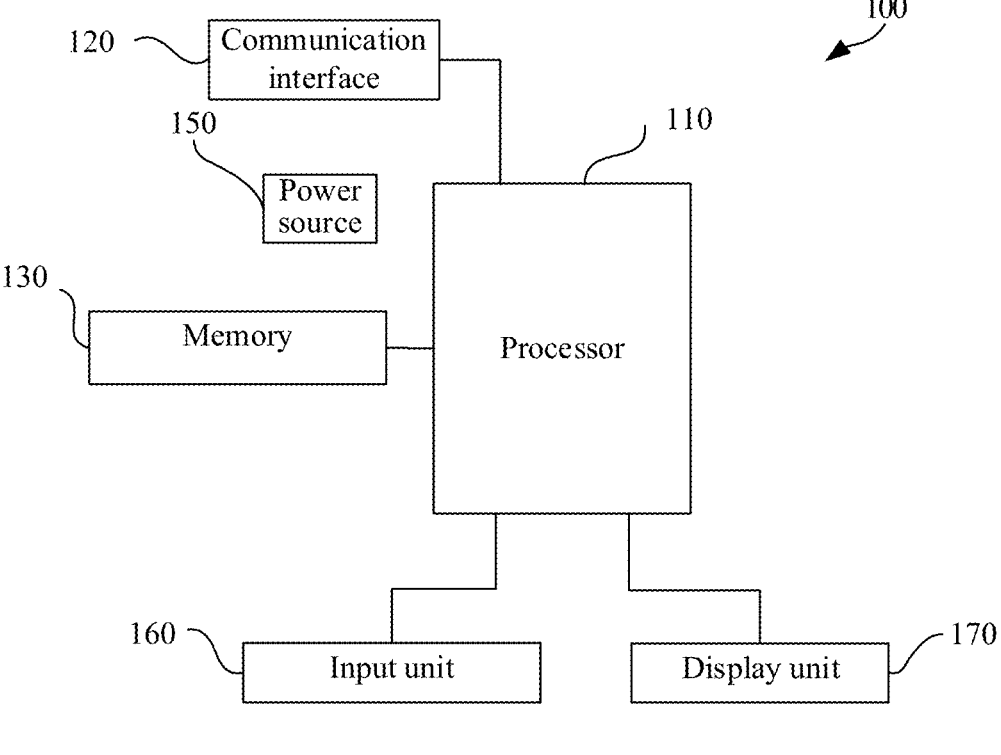
FIG. 1 is a schematic structural diagram of a brain-computer interface device according to an embodiment of the present disclosure.

Terms used in embodiments of the present disclosure are intended to explain specific embodiments of the present disclosure only, rather than to limit the present disclosure.

Based on problems of unsatisfactory interactivity between a user and a brain-computer interface device and a weak sense of immersion of the user in the related art, the embodiments of the present disclosure provide a method for controlling the brain-computer interface device, which can control the brain-computer interface device using fuzzy control based on electroencephalogram data of the user and image data displayed by the brain-computer interface device. Therefore, the interactivity between the user and the brain-computer interface device and the sense of immersion of the user are improved, which brings more intelligent control experience to the user.

The fuzzy control and the electroencephalogram data mentioned in the embodiments of the present disclosure are first introduced below.

1. Fuzzy Control

Fuzzy control is a control method based on fuzzy logic, which is used to deal with a complex, uncertain, or fuzzy system. Fuzzy control is a rule-based control method that realizes control decisions through fuzzy inference and fuzzy rules.

In fuzzy control, an input variable and an output variable are defined as fuzzy variables, which may have fuzzy and imprecise values. Different from a traditional precise control method, fuzzy control deals with fuzzy variables by using a fuzzy set and fuzzy rules.

The following are general steps of fuzzy control.

Fuzzification: the input variable is converted from an actual value to a fuzzy value. This involves mapping the actual value to a group of fuzzy sets that represent fuzzy nature of the variables. Common mapping methods may include a triangular function, a trapezoidal function, etc.

Rule base: a set of fuzzy rules is defined, which describes a relationship between the input variable and the output variable. The fuzzy rule usually takes a form of "if-then" and is formulated based on empirical knowledge or expert experience.

Inference engine: inference is performed based on the fuzzy rule to derive a fuzzy output variable from a fuzzy input variable. Common inference methods may include fuzzy association, fuzzy inference, and/or fuzzy conjunction, etc.

Defuzzification: the fuzzy output variable is converted to the actual value. This involves mapping the fuzzy variable back to the actual value to obtain a control output of the system. Common defuzzification methods include a maximum method and/or a weighted average method.

Fuzzy control is widely used in many fields, such as automation control, robot control, traffic control, and power system control. Fuzzy control can deal with a nonlinear, time-varying, fuzzy, or uncertain system, and has a low requirement for system modeling and strong adaptability. Of course, fuzzy control also has some limitations. For example, rule design and selection of the fuzzy set require domain expertise, and a large number of rules may be required when dealing with complex systems.

2. Electroencephalogram Data

Electroencephalogram (EEG) data is a recording obtained by measuring electrical activity of nerves on a scalp. The electroencephalogram data reflects electrical activity of neurons in the brain and is used to study and diagnose various conditions and diseases related to a brain function. The electroencephalogram data is used to measure brain electrical activity by placing electrodes on the scalp. These electrodes record electric potential changes in different areas of the brain, forming a multi-channel voltage time series.

1) Characteristics of the electroencephalogram data: the electroencephalogram data usually has a wide spectral range from a low frequency to a high frequency. Brain waves in different frequency bands include $\delta$ (0.5 Hz to 4 Hz), $\theta$ (4 Hz to 8 Hz), $\alpha$ (8 Hz to 13 Hz), $\beta$ (13 Hz to 30 Hz), and $\gamma$ (30 Hz and above).

2) Application fields: the electroencephalogram data is widely used in neuroscience, clinical medicine, cognitive psychology, and other fields, which can be used to study the brain function such as sleep, consciousness, attention, mood and/or memory, and diagnose and monitor diseases such as epilepsy, sleep disorder, and/or brain injury.

3) Data analysis methods: for an analysis of the electroencephalogram data, commonly used methods include time domain analysis, frequency domain analysis, and time-frequency domain analysis. The time domain analysis focuses on an amplitude and waveform characteristics of an electroencephalogram signal. The frequency domain analysis is used to study brain wave activities in different frequency bands. The time-frequency domain analysis combines time information and frequency information.

4) Preprocessing steps: a preprocessing of the electroencephalogram data usually includes steps such as filtering, denoising, and artifact removal. The filtering is used to remove frequency components that are not of interest. The denoising method may include mean filtering, wavelet denoising, and/or independent component analysis, etc.

5) Feature extraction: extracting useful features from the electroencephalogram data is a key step for further analysis and research. Common features include spectral power, time domain statistical feature, coherence and/or phase synchronization, and the like.

6) Machine learning applications: the electroencephalogram data is also widely used in machine learning, such as classification and control of a brain computer interface (BCI), emotion recognition, cognitive load assessment, and other tasks of brain waves.

The method for controlling the brain-computer interface device according to the embodiments of the present disclosure may be provided in the brain-computer interface device. The above-described brain-computer interface device may be a smart phone, a tablet computer, a wearable device, a vehicle-mounted device, an augmented reality (AR)/VR device, a notebook computer, or an ultra-mobile personal computer (UMPC), etc. The embodiments of the present disclosure do not impose any restrictions on specific types of the brain-computer interface device. In the following embodiments of the present disclosure, as an example, the brain-computer interface device 100 is described as a VR device.

Illustratively, FIG. 1 is a schematic structural diagram of a brain-computer interface device according to an embodiment of the present disclosure. As illustrated in FIG. 1, the brain-computer interface device 100 includes a processor 110 and a communication interface 120. Optionally, the brain-computer interface device 100 may further include a memory 130. The processor 110, the communication interface 120, and the memory 130 may communicate with each other through an internal connection path to transmit control and/or data signals. The memory 130 is configured to store a computer program. The processor 110 is configured to invoke and execute the computer program in the memory 130.

The processor 110 and the memory 130 may be combined into a processing device. More commonly, the processor 110 and the memory 130 are separate components from each other. The processor 110 is configured to execute program codes stored in the memory 130. In a specific implementation, the memory 130 may also be integrated in the processor 110, or independent of the processor 110.

In addition, to improve a function of the brain-computer interface device 100, the brain-computer interface device 100 may further include one or more of an input unit 160, a display unit 170, and the like.

Optionally, the brain-computer interface device 100 may further include a power source 150 configured to supply power to various devices or circuits in the brain-computer interface device 100.

It should be understood that, the processor 110 in the brain-computer interface device 100 illustrated in FIG. 1 may be a system-on-chip (SOC). The processor 110 may include a central processing unit (CPU), and may further include other types of processors, such as a graphics processing unit (GPU).

To facilitate understanding, the following embodiments of the present disclosure take the brain-computer interface device having the structure illustrated in FIG. 1 as an example, and specifically describe the method for controlling the brain-computer interface device according to the embodiments of the present disclosure in combination with the accompanying drawings and application scenarios.

FIG. 2 is a flowchart of a method for controlling a brain-computer interface device according to an embodiment of the present disclosure. As illustrated in FIG. 2, the above-described method for controlling the brain-computer interface device may include operations at blocks.

At block 201, the brain-computer interface device 100 obtains electroencephalogram data of a user.

In a specific implementation, electrodes may be placed on the scalp of the user to measure the electroencephalogram data of the user. The brain-computer interface device 100 is connected to the electrode to obtain the electroencephalogram data measured by the electrode. In this operation, the brain-computer interface device 100 may be mechanically or communicatively connected to the electrode. This embodiment is not limited to any of these examples.

At block 202, the brain-computer interface device 100 extracts a multi-modal feature from the electroencephalogram data and image data displayed by the brain-computer interface device 100.

In this embodiment, the user can interact with the brain-computer interface device 100 through the electroencephalogram data to control the brain-computer interface device 100 to execute an instruction. Subsequent to executing the instruction by the brain-computer interface device 100, an image corresponding to the instruction is displayed.

Subsequent to obtaining, by the brain-computer interface device 100, the electroencephalogram data of the user, the multi-modal feature may be extracted from the electroencephalogram data and the image data displayed by the brain-computer interface device 100, in such a manner that the brain-computer interface device 100 is controlled by using the multi-modal feature. Since the multi-modal feature is extracted from the electroencephalogram data and the image data displayed by the brain-computer interface device 100, the interactivity between the user and the brain-computer interface device 100 and the sense of immersion of the user can be improved.

At block 203, the brain-computer interface device 100 obtains a fuzzy set corresponding to the multi-modal feature based on the multi-modal feature.

At block 204, the brain-computer interface device 100 obtains a control instruction corresponding to the multi-modal feature based on the fuzzy set corresponding to the multi-modal feature.

Specifically, obtaining, by the brain-computer interface device 100, the control instruction corresponding to the multi-modal feature based on the fuzzy set corresponding to the multi-modal feature may include: obtaining a relation matrix based on the fuzzy set corresponding to the multi-modal feature and a predetermined control accuracy set; selecting a fuzzy output result from the relation matrix based on a fuzzy membership degree; and obtaining the control instruction corresponding to the multi-modal feature based on the fuzzy output result.

Obtaining the relation matrix based on the fuzzy set corresponding to the multi-modal feature and the predetermined control accuracy set may include: calculating a Cartesian product of the fuzzy set corresponding to the multi-modal feature and the predetermined control accuracy set, and determining the calculated Cartesian product as the relation matrix.

Selecting the fuzzy output result from the relation matrix based on the fuzzy membership degree may include: selecting a component having a maximum fuzzy membership degree from the relation matrix as the fuzzy output result.

Obtaining the control instruction corresponding to the multi-modal feature based on the fuzzy output result may include: mapping the fuzzy output result to the control instruction using the defuzzification method, such as the maximum method and/or the weighted average method.

At block 205, the brain-computer interface device 100 executes the control instruction.

In the above method for controlling the brain-computer interface device, subsequent to obtaining, by the brain-computer interface device 100, the electroencephalogram data of the user, the multi-modal feature is extracted from the electroencephalogram data and the image data displayed by the brain-computer interface device 100. The fuzzy set corresponding to the multi-modal feature is obtained by the brain-computer interface device 100 based on the multi-modal feature. Further, the control instruction corresponding to the multi-modal feature is obtained by the brain-computer interface device 100 based on the fuzzy set corresponding to the multi-modal feature. The control instruction is executed by the brain-computer interface device 100, in such a manner that the brain-computer interface device 100 can be controlled based on the electroencephalogram data of the user and the image data displayed by the brain-computer interface device, which improves the interactivity between the user and the brain-computer interface device and the sense of immersion of the user, bringing more intelligent control experience to the user.

FIG. 3 is a flowchart of a method for controlling a brain-computer interface device according to another embodiment of the present disclosure. As illustrated in FIG. 3, in the embodiment illustrated in FIG. 2 of the present disclosure, the operation at block 202 may include operations at blocks.

At block 301, the brain-computer interface device 100 encodes the electroencephalogram data to obtain an electroencephalogram vector, and encodes the image data to obtain an image vector.

In some embodiments, that "the brain-computer interface device 100 encodes the electroencephalogram data to obtain an electroencephalogram vector" may mean that: the brain-computer interface device 100 performs a discrete wavelet transform on electroencephalogram data of each channel to obtain a two-dimensional electroencephalogram feature map of each channel. The two-dimensional electroencephalogram feature map of each channel includes a time domain feature and a frequency domain feature of each channel. Obtained two-dimensional electroencephalogram feature maps are merged by the brain-computer interface device 100 to obtain a three-dimensional electroencephalogram time-frequency domain feature. A feature extraction is performed on the three-dimensional electroencephalogram time-frequency domain feature for each channel to obtain a first deep feature of each channel in a time dimension. A cross-channel feature extraction is performed on the three-dimensional electroencephalogram time-frequency domain feature to obtain a second deep feature between channels in a spatial dimension. The electroencephalogram vector is obtained by the brain-computer interface device 100 based on the first deep feature and the second deep feature.

In some embodiments, the image data may include local image data which is in an image displayed by the brain-computer interface device 100 and which includes a viewpoint of the user at a current time point. That "the brain-computer interface device 100 encodes the image data to obtain an image vector" may include: performing an image preprocessing on the local image data to obtain a viewpoint attention image; extracting a deep feature image from the viewpoint attention image using a base convolutional layer and a deep residual layer; and obtaining the image vector based on the deep feature image.

At block 302, the brain-computer interface device 100 performs a feature transformation on the electroencephalogram vector to obtain an electroencephalogram feature vector, and performs a feature transformation on the image vector to obtain an image feature vector.

At block 303, the brain-computer interface device 100 obtains the multi-modal feature based on the electroencephalogram feature vector and the image feature vector.

In a specific implementation, the electroencephalogram data may be encoded by the brain-computer interface device 100 using an electroencephalogram feature encoder to obtain a one-dimensional electroencephalogram vector; and the image data may be encoded by the brain-computer interface device 100 using a visual encoder to obtain a one-dimensional image vector.

A convolution operation is performed by the brain-computer interface device 100 on the one-dimensional electroencephalogram vector using a set of 1×1 convolutions to obtain the electroencephalogram feature vector; and a convolution operation is performed by the brain-computer interface device 100 on the one-dimensional image vector using another set of 1×1 convolutions to obtain the image feature vector. The image feature vector has a same dimension as the electroencephalogram feature vector.

The brain-computer interface device 100 may perform an element-wise addition on the electroencephalogram feature vector and the image feature vector, and then an activation is performed using a sigmoid function to obtain the multi-modal feature.

A process of encoding, by the brain-computer interface device 100, the electroencephalogram data using the electroencephalogram feature encoder to obtain the one-dimensional electroencephalogram vector is described below. The process of encoding the electroencephalogram data may include the following steps.

In step 1, the electroencephalogram data is processed by using a band-pass filter to filter out out-of-band high-frequency signals and out-of-band low-frequency signals.

In step 2, each channel of the filtered electroencephalogram data is processed by using the discrete wavelet transform to obtain the two-dimensional electroencephalogram feature map of each channel. The two-dimensional electroencephalogram feature map of each channel includes the time domain feature and the frequency domain feature of each channel.

In step 3, two-dimensional electroencephalogram feature maps of all channels are merged to obtain the three-dimensional electroencephalogram time-frequency domain feature.

In step 4, the feature extraction is performed on the three-dimensional electroencephalogram time-frequency domain feature by using 1×1 convolutions on each channel to obtain the first depth feature of each channel in the time dimension.

In step 5, the cross-channel feature extraction is performed on the three-dimensional electroencephalogram time-frequency domain feature by using 1×1 convolutions to obtain the second deep feature between channels in the spatial dimension.

In step 6, the first deep feature and the second deep feature are compressed into one-dimensional vectors by using spatial average pooling to obtain the one-dimensional electroencephalogram vector.

A process of encoding, by the brain-computer interface device 100, the image data using the visual encoder to obtain the one-dimensional image vector is described below. The process of encoding the image data may include the following steps.

In step 1, the image data is processed through the base convolutional layer. This step can specify that the number of channels of an input feature map is 3, the number of channels of an output feature map is 32, a size of a convolution kernel is 3, a jump step size is 2, and the number of columns of filled pixels is 1. After this step, a width and a height of a feature map are halved, the number of channels becomes 32, and a result is recorded as c1.

In step 2, a processing result of the step 1 is processed through the base convolutional layer. This step can specify that the number of channels of the input feature map is 32, the number of channels of the output feature map is 64, the size of the convolution kernel is 3, the jump step size is 2, and the number of columns of filled pixels is 1. After this step, the width and the height of the feature map are halved, the number of channels becomes 64, and a result is recorded as c2.

In step 3, a processing result of the step 2 is processed through the deep residual layer. This step may specify that each of parameters C1 and C2 is 64. After this step, the width and the height of the feature map are halved, the number of channels becomes 128, and a result is recorded as r1.

In step 4, a processing result of the step 3 is processed through the deep residual layer. This step may specify that each of parameters C1 and C2 is 128. After this step, the width and the height of the feature map are halved, the number of channels becomes 256, and a result is recorded as r2.

In step 5, a processing result of the step 4 is processed through the deep residual layer. This step can specify that each of parameters C1 and C2 is 256. After this step, the width and the height of the feature map are halved, the number of channels becomes 256, and a result is recorded as r3.

In step 6, a processing result of the step 5 is processed through the deep residual layer. This step can specify that the number of channels of the input feature map is 512, the number of channels of the output feature map is 512, the size of the convolution kernel is 3, the jump step size is 1, and the number of columns of filled pixels is 1. After this step, the width and the height of the feature map remain unchanged, the number of channels becomes 512, and a result is recorded as c3.

In step 7, a convolution operation is performed on c3 using the spatial average pooling to obtain a feature vector c4 having a size of 1×1×512.

In step 8, a convolution operation is performed on the feature vector c4 using a set of 1×1 convolutions to obtain the one-dimensional image vector. The one-dimensional image vector has the same dimension as the one-dimensional electroencephalogram vector.

The following describes a calculation process of the deep residual layer used in the process of encoding the image data, which may specifically include the following steps.

In step 1, let a size of the input feature map be W×H×C1, where W represents a width of the input feature map, H represents a height of the input feature map, and C1 represents the number of channels of the input feature map. In the embodiments of the present disclosure, a square image is used. Therefore, W is equal to H, and the input feature map is represented by U.

In step 2, the input feature map U is processed through the base convolutional layer. This step can specify that the number of channels of the input feature map is C1, the number of channels of the output feature map is C2, the size of the convolution kernel is 3, the jump step size is 1, and the number of columns of filled pixels is 1. Specifically, the output feature map can be obtained according to equation (1):

$$N = \left[ \frac{W - F + 2P}{S} \right] + 1 \qquad (1)$$

In equation (1), W represents the width of the input feature map, F represents the size of the convolution kernel, P represents the number of columns of filled pixels, S represents the jump step size, and N represents a width of the output feature map. Since the square image is used, a height of the output feature map is equal to N. After this step, the width and the height of the feature map remain unchanged, the number of channels becomes C2, and a result of this step is recorded as R.

In step 3, the channel is segmented, an output feature map R obtained in the step 2 is divided into a left half and a right half in a channel direction, and the right half is retained and recorded as R2.

In step 4, a feature map R2 is processed through the base convolutional layer. This step can specify that the number of channels of the input feature map is C2/2, the number of channels of the output feature map is C2/2, the size of the convolution kernel is 3, the jump step size is 1, and the number of columns of filled pixels is 1. A calculation method of the step 4 is the same as that of the step 2. After the step 4, the width and the height of the feature map remain unchanged, the number of channels becomes C2/2, and a result is recorded as K1.

In step 5, a feature map K1 is processed through the base convolutional layer. This step can specify that the number of channels of the input feature map is C2/2, the number of channels of the output feature map is C2/2, the size of the convolution kernel is 3, the jump step size is 1, and the number of columns of filled pixels is 1. After the step 5, the width and the height of the feature map remain unchanged, the number of channels becomes C2/2, and a result is recorded as K2.

In step 6, the feature map K1 and the feature map K2 are merged along a channel dimension to obtain a feature map K3. The number of channels of the feature map K3 is C2.

In step 7, the feature map K3 is processed through the base convolutional layer. This step can specify that the number of channels of the input feature map is C2, the number of channels of the output feature map is C2, the size of the convolution kernel is 3, the jump step size is 1, and the number of columns of filled pixels is 1. After the step 7, the width and the height of the feature map remain unchanged, the number of channels becomes C2, and a result is recorded as K4.

In step 8, the feature map R and the feature map K4 are merged along a channel dimension to obtain a feature map K5. The number of channels of the feature map K5 is 2×C2.

In step 9, max-pooling is performed on the feature map K5 to obtain a feature map X. After the step 9, the width and the height of the feature map are halved, and the number of channels remains unchanged. Therefore, a size of the feature map X is: (W/2)×(H/2)×(2×C2).

FIG. 4 is a flowchart of a method for controlling a brain-computer interface device according to yet another embodiment of the present disclosure. As illustrated in FIG. 4, in the embodiment illustrated in FIG. 2 of the present disclosure, the operation at the block 203 may include operations at blocks.

At block 401, the brain-computer interface device 100 performs feature mapping on the multi-modal feature.

In this embodiment, a process of performing, by the brain-computer interface device 100, the feature mapping on the multi-modal feature may include the following steps.

In step 1, a competitive learning network including an input layer and a competitive layer is built. The number of nodes of neurons in the input layer is the same as the dimensions of the multi-modal feature. The competitive layer is composed of N neurons. N is the same as the number of types of actions performed by the user to control the brain-computer interface device 100. Each neuron in the competitive layer is connected to all neurons in the input layer.

In step 2, the competitive learning network is trained by using a winner-takes-all learning rule, which may specifically include the following steps.

In step 21, normalization of input data: multi-modal features corresponding to electroencephalogram data and image data at a certain time point are normalized as an input vector of the input layer, which is recorded as an input mode vector $X_p$.

In step 22, normalization of an instar vector: the instar vector corresponding to each neuron in the competitive layer is normalized to obtain a normalized instar vector $W_j$.

In step 23, searching for a winning neuron: a similarity between the input mode vector $X_p$ and the normalized instar vector $W_j$ is compared using an inner product. The neuron corresponding to the normalized instar vector $W_j$ having a maximum inner product result in the competitive layer is the winning neuron, the instar vector corresponding to the winning neuron is recorded as $W_j^*$.

In step 24, network output and weight adjustment: an output of the winning neuron is set to 1, while an output of each of remaining neurons is set to zero. Only the winning neuron has a right to adjust the instar vector $W_j^*$. An adjustment method may be as illustrated in equation (2):

$$W_j^*(t+1) = W_j^*(t) + \Delta W_j = W_j^*(t) + \alpha \left( X_p - W_j^*(t) \right) \qquad (2)$$

In equation (2), a represents a learning rate, which has a value ranging from 0 to 1 and gradually decreasing as learning progresses, $W_j^*(t)$ represents an instar vector at a current time point, and $W_j^*(t+1)$ represents an adjusted instar vector.

In step 25, when the learning rate a is reduced to 0, the training ends. Parameters of the competitive learning network are fixed for subsequent classification tasks. The output of the competitive learning network is an N-dimensional vector, with only one component being 1. The instar vectors corresponding to N neurons are cluster centers of their respective modes. A component having a value of 1 indicates that the neuron corresponding to the component is activated and is about to perform an action corresponding to the control instruction.

At block 402, the brain-computer interface device 100 fuzzifies a result of the feature mapping to obtain the fuzzy set corresponding to the multi-modal feature.

Specifically, fuzzifying, by the brain-computer interface device 100, the result of the feature mapping to obtain the fuzzy set corresponding to the multi-modal feature may include: obtaining, by the brain-computer interface device 100, an Euclidean distance between the result of the feature mapping and a cluster center corresponding to the result of the feature mapping; discretizing the Euclidean distance to obtain a discrete domain value corresponding to the Euclidean distance; determining a control adjustment amount corresponding to the multi-modal feature based on the discrete domain value corresponding to the Euclidean distance; and obtaining the fuzzy set corresponding to the multi-modal feature based on the control adjustment amount corresponding to the multi-modal feature.

The above process is described in detail below.

In step 1, subsequent to obtaining, by the brain-computer interface device 100, the Euclidean distance between the result of the feature mapping and the cluster center corresponding to the result of the feature mapping, the Euclidean distance is discretized to obtain the discrete domain value corresponding to the Euclidean distance.

Specifically, the Euclidean distance may be discretized by using equation (3).

$$b = \mathrm{round}\left[k\left(a - \frac{d}{2}\right)\right] \cdot k = \frac{2n}{d} \qquad (3)$$

In equation (3), k represents a quantization factor, a represents the Euclidean distance between the feature mapping result of the multi-modal feature and the cluster center corresponding to the feature mapping result of the multi-modal feature, d represents a maximum Euclidean distance statistically determined, round [ ] represents a rounding operation, b represents the discrete domain value corresponding to the Euclidean distance, and n represents a quantization accuracy control parameter.

In step 2, the control adjustment amount corresponding to the multi-modal feature is determined based on the discrete domain value corresponding to the Euclidean distance.

Specifically, subsequent to obtaining the discrete domain value, a classification to which the Euclidean distance belongs may be determined based on a position of the discrete domain value in the discrete domain.

In an example, if the quantization accuracy control parameter n is set to 4, the discrete domain may be:

$$V = \{-4, -3, -2, -1, 0, 1, 2, 3, 4\},$$

where components in V, from left to right, represent that the Euclidean distances between the result of the feature mapping and the cluster center corresponding to the result of the feature mapping is very large negative, large negative, medium negative, small negative, zero, small positive, medium positive, large positive, and very large positive.

In this way, when the discrete domain values b obtained in the step 1 are −4, −3, −2, −1, 0, 1, 2, 3, and 4, the brain-computer interface device 100 may determine that the Euclidean distances between the result of the feature mapping and the cluster center corresponding to the result of the feature mapping are very large negative, large negative, medium negative, small negative, zero, small positive, medium positive, large positive, and very large positive respectively.

If the Euclidean distance is very large positive, the control adjustment amount corresponding to the multi-modal feature is very large negative.

If the Euclidean distance is large positive, the control adjustment amount corresponding to the multi-modal feature is large negative.

If the Euclidean distance is medium positive, the control adjustment amount corresponding to the multi-modal feature is medium negative.

If the Euclidean distance is small positive, the control adjustment amount corresponding to the multi-modal feature is small negative.

If the Euclidean distance is zero, the control adjustment amount corresponding to the multi-modal feature is zero.

If the Euclidean distance is small negative, the control adjustment amount corresponding to the multi-modal feature is large positive.

If the Euclidean distance is medium negative, the control adjustment amount corresponding to the multi-modal feature is medium positive.

If the Euclidean distance is large negative, the control adjustment amount corresponding to the multi-modal feature is large positive.

If the Euclidean distance is very large negative, the control adjustment amount corresponding to the multi-modal feature is very large positive.

In step 3, the fuzzy set corresponding to the multi-modal feature is obtained based on the control adjustment amount corresponding to the multi-modal feature.

In this embodiment, the control adjustment amount and the corresponding fuzzy set can be illustrated in equation (4):

$$
\begin{aligned}
PBB &= (0, 0, 0, 0, 0, 0, 0, 0.5, 1) \qquad (4)\\
PB &= (0, 0, 0, 0, 0, 0, 0.5, 1, 0)\\
PM &= (0, 0, 0, 0, 0, 0.5, 1, 0.5, 0)\\
PS &= (0, 0, 0, 0, 0.5, 1, 0.5, 0, 0)\\
ZE &= (0, 0, 0, 0.5, 1, 0.5, 0, 0, 0)\\
NS &= (00, 0.5, 1, 0.5, 0, 0, 0, 0)\\
NM &= (0, 0.5, 1, 0.5, 0, 0, 0, 0, 0)\\
NB &= (0, 1, 0.5, 0, 0, 0, 0, 0, 0)\\
NBB &= (1, 0.5, 0, 0, 0, 0, 0, 0, 0)
\end{aligned}
$$

where PBB, PB, PM, PS, ZE, NS, NM, NB, and NBB represent that the control adjustment amounts are very large positive, large positive, medium positive, small positive, zero, small negative, medium negative, large negative, and very large negative, respectively.

For example, assuming that the discrete domain value b obtained in the step 1 is 2, the brain-computer interface device 100 determines, based on the discrete domain value, that the Euclidean distance between the result of the feature mapping and the cluster center corresponding to the result of the feature mapping is medium positive, which further determines that the control adjustment amount corresponding to the multi-modal feature is medium negative. Then, according to equation (4), the brain-computer interface device 100 may obtain the fuzzy set corresponding to the multi-modal feature as NM=(0, 0.5, 1, 0.5, 0, 0, 0, 0, 0).

Then, the brain-computer interface device 100 may calculate a Cartesian product of the fuzzy set NM and the predetermined control accuracy set P to obtain the relation matrix.

In this example, the control accuracy set P may be illustrated as equation (5):

$$P = \left\{-s * \frac{m}{s}, \cdots, -3 * \frac{m}{s}, -2 * \frac{m}{s}, -\frac{m}{s}, 0, \frac{m}{s}, 2 * \frac{m}{s}, 3 * \frac{m}{s}, \cdots, s * \frac{m}{s}\right\} \qquad (5)$$

In equation (5), m represents a maximum value of the control amount, and s represents a control accuracy parameter. The control amount may be an action or an operation to be performed by the brain-computer interface device 100.

Subsequent to obtaining the relation matrix, the brain-computer interface device 100 may select the component having the maximum fuzzy membership degree from the relation matrix as the fuzzy output result, and map the fuzzy output result to the control instruction using the defuzzification method, such as the maximum method and/or the weighted average method.

The brain-computer interface device 100 executes the control instruction, in such a manner that the brain-computer interface device 100 is controlled to perform actions or operations through the electroencephalogram data of the user and the image data displayed by the brain-computer interface device 100, which improves the interactivity between the user and the brain-computer interface device 100 and the sense of immersion of the user, bringing more intelligent and personalized control experience to the user. In practical applications, customized design and development can also be carried out based on specific control requirements and user experience.

It should be understood that, some or all of the steps or operations in the above embodiments are merely examples. Also, other operations or variations of various operations can be performed according to the embodiments of the present disclosure. Further, various steps may be performed in a different order from that presented in the above embodiments, and it is not necessary to perform all the operations in the above embodiments.

It should be understood that, to implement the above functions, the brain-computer interface device includes hardware and/or software modules for performing respective functions. Exemplary algorithm steps described in combination with embodiments disclosed herein may be implemented by hardware, or by a combination of hardware and computer software. Whether these functions are executed by hardware or computer software driving hardware is dependent on particular use and design constraints of the technical solutions. Those skilled in the art may adopt different methods in combination with the embodiments for different particular uses to implement described functions, which should not be regarded as going beyond the scope of the present disclosure.

In this embodiment, the brain-computer interface device can be divided into functional modules based on the above method embodiments. For example, functional modules can be divided based on functions, or two or more functions can be integrated into one module. The above integrated module can be implemented in a form of hardware. It should be noted that the division of modules in the embodiments of the present disclosure is illustrative, and the modules are merely divided based on logic functions. In practical implementation, the modules can be divided in other manners.

Figure 5:
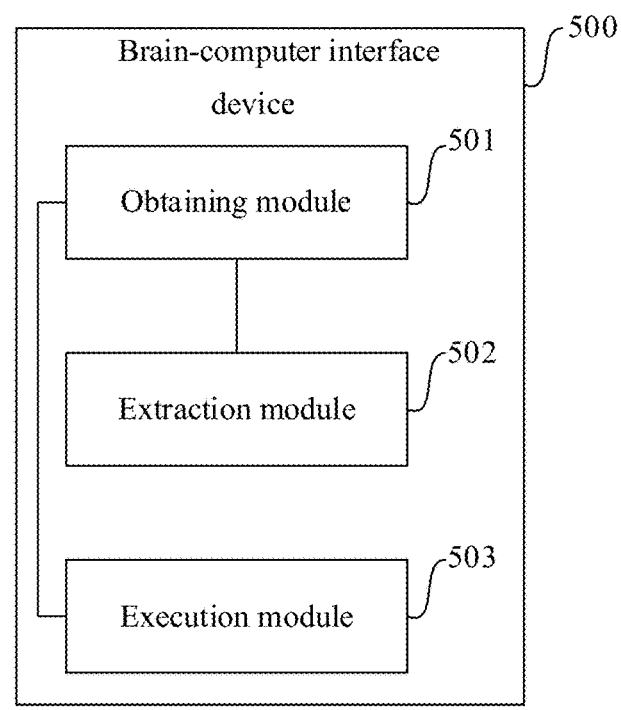
FIG. 5 is a schematic structural diagram of a brain-computer interface device according to another embodiment of the present disclosure.

FIG. 5 is a schematic structural diagram of a brain-computer interface device according to another embodiment of the present disclosure. In a case where functional modules are divided based on functions, FIG. 5 illustrates a schematic diagram of a possible composition of a brain-computer interface device 500 according to the above embodiment. As illustrated in FIG. 5, the brain-computer interface device 500 may include an obtaining module 501, an extraction module 502, and an execution module 503.

The obtaining module 501 is configured to obtain electroencephalogram data of a user.

The extraction module 502 is configured to extract a multi-modal feature from the electroencephalogram data and image data displayed by the brain-computer interface device.

The obtaining module 501 is further configured to obtain a fuzzy set corresponding to the multi-modal feature based on the multi-modal feature, and obtain a control instruction corresponding to the multi-modal feature based on the fuzzy set corresponding to the multi-modal feature.

The execution module 503 is configured to execute the control instruction.

It should be noted that, all related contents of steps involved in the method embodiments illustrated in FIG. 2 of the present disclosure can be referred to in the functional description of the corresponding function modules, and thus details thereof will be omitted here.

The brain-computer interface device 500 according to this embodiment is configured to perform the method for controlling the brain-computer interface device according to the embodiment illustrated in FIG. 2 of the present disclosure, and thus the same effect as the above method can be achieved.

Figure 6:
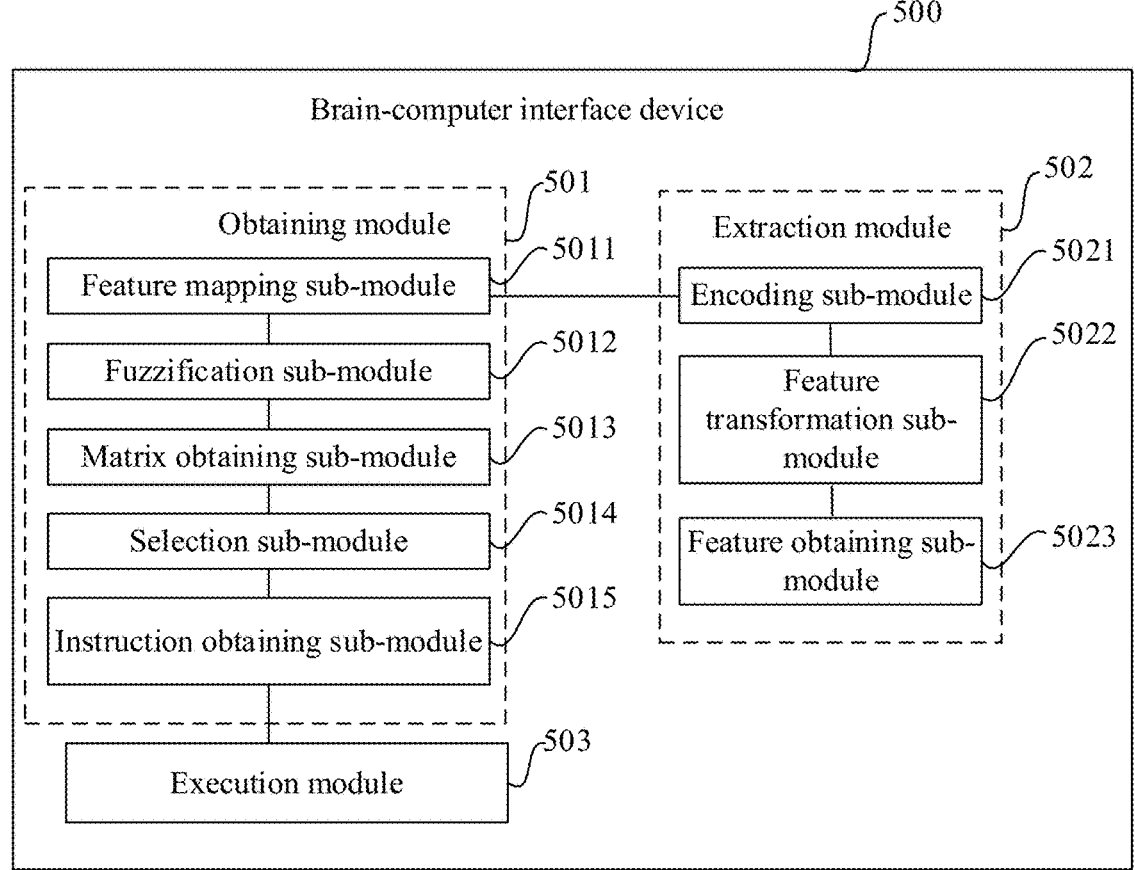
FIG. 6 is a schematic structural diagram of a brain-computer interface device according to yet another embodiment of the present disclosure.

FIG. 6 is a schematic structural diagram of a brain-computer interface device according to yet another embodiment of the present disclosure. Compared with the brain-computer interface device illustrated in FIG. 5, in the brain-computer interface device 500 illustrated in FIG. 6, the obtaining module 501 may include a feature mapping sub-module 5011, a fuzzification sub-module 5012, a matrix obtaining sub-module 5013, a selection sub-module 5014, and an instruction obtaining sub-module 5015.

The feature mapping sub-module 5011 is configured to perform feature mapping on the multi-modal feature.

The fuzzification sub-module 5012 is configured to fuzzify a result of the feature mapping to obtain the fuzzy set corresponding to the multi-modal feature.

In this embodiment, the matrix obtaining sub-module 5013 is configured to obtain a relation matrix based on the fuzzy set corresponding to the multi-modal feature and a predetermined control accuracy set.

The selection sub-module 5014 is configured to select a fuzzy output result from the relation matrix based on a fuzzy membership degree.

The instruction obtaining sub-module 5015 is configured to obtain the control instruction corresponding to the multi-modal feature based on the fuzzy output result.

In this embodiment, the extraction module 502 may include an encoding sub-module 5021, a feature transformation sub-module 5022, and a feature obtaining sub-module 5023.

The encoding sub-module 5021 is configured to encode the electroencephalogram data to obtain an electroencephalogram vector, and encode the image data to obtain an image vector.

The feature transformation sub-module 5022 is configured to perform a feature transformation on the electroencephalogram vector to obtain an electroencephalogram feature vector, and perform a feature transformation on the image vector to obtain an image feature vector.

The feature obtaining sub-module 5023 is configured to obtain the multi-modal feature based on the electroencephalogram feature vector and the image feature vector.

In some examples, the encoding sub-module 5021 is specifically configured to: perform a discrete wavelet transform on electroencephalogram data of each channel to obtain a two-dimensional electroencephalogram feature map of each channel, the two-dimensional electroencephalogram feature map of each channel including a time domain feature and a frequency domain feature of each channel; merge obtained two-dimensional electroencephalogram feature maps to obtain a three-dimensional electroencephalogram time-frequency domain feature; perform a feature extraction on the three-dimensional electroencephalogram time-frequency domain feature for each channel to obtain a first deep feature of each channel in a time dimension, and perform a cross-channel feature extraction on the three-dimensional electroencephalogram time-frequency domain feature to obtain a second deep feature between channels in a spatial dimension; and obtain the electroencephalogram vector based on the first deep feature and the second deep feature.

In some embodiments, the image data may include local image data which is in an image displayed by the brain-computer interface device 100 and which includes a viewpoint of the user at a current time point. The encoding sub-module 5021 is specifically configured to: perform an image preprocessing on the local image data to obtain a viewpoint attention image; extract a deep feature image from the viewpoint attention image using a base convolutional layer and a deep residual layer; and obtain the image vector based on the deep feature image.

In some examples, the fuzzification sub-module 5012 is specifically configured to: obtain an Euclidean distance between the result of the feature mapping and a cluster center corresponding to the result of the feature mapping; discretize the Euclidean distance to obtain a discrete domain value corresponding to the Euclidean distance; determine a control adjustment amount corresponding to the multi-modal feature based on the discrete domain value corresponding to the Euclidean distance; and obtain the fuzzy set corresponding to the multi-modal feature based on the control adjustment amount corresponding to the multi-modal feature.

It should be noted that, all related contents of steps involved in the method embodiments illustrated in FIG. 2 to FIG. 4 of the present disclosure can be referred to in the functional description of the corresponding function modules, and thus details thereof will be omitted here.

The brain-computer interface device 500 according to this embodiment is configured to perform the method for controlling the brain-computer interface device according to the embodiment illustrated in FIG. 2 to FIG. 4 of the present disclosure, and thus the same effect as the above method can be achieved.

It should be understood that, the brain-computer interface device 500 may correspond to the brain-computer interface device 100 illustrated in FIG. 1. Functions of the obtaining module 501, the extraction module 502, and the execution module 503 may be implemented by the processor 110 in the brain-computer interface device 100 illustrated in FIG. 1.

When an integrated unit is employed, the brain-computer interface device 500 may include a processing module, a storage module, and a communication module.

The processing module may be configured to control and manage actions of the brain-computer interface device 500, for example, to support the brain-computer interface device 500 to perform the steps performed by the modules. The storage module may be configured to support the brain-computer interface device 500 to store program codes, data, and the like. The communication module may be configured to support communication between the brain-computer interface device 500 and other devices.

The processing module may be a processor or a controller that may implement or execute various exemplary logic blocks, modules, and circuits described in connection with the present disclosure. The processor may also be a combination that implements computing functions, such as a combination of one or more microprocessors, a combination of digital signal processing (DSP) and microprocessors, etc. The storage module may be a memory. Specifically, the communication module may be a device that interacts with other brain-computer interface devices, such as a radio frequency circuit, a Bluetooth chip, and/or a Wi-Fi chip.

In an embodiment, when the processing module is a processor and the storage module is a memory, the brain-computer interface device 500 involved in this embodiment may be a device having the structure illustrated in FIG. 1.

The embodiments of the present disclosure further provide a computer-readable storage medium. The computer-readable storage medium has a computer program stored thereon. The computer program, when executed by a computer, causes the computer to perform the method according to any of the embodiments illustrated in FIG. 2 to FIG. 4 of the present disclosure.

The embodiments of the present disclosure further provide a computer program product. The computer program product includes a computer program. The computer program, when executed by a computer, causes the computer to perform the method according to any of the embodiments illustrated in FIG. 2 to FIG. 4 of the present disclosure.

In the present disclosure, "at least one" refers to one or more, and "a plurality of" refers to two or more than two. The expression "and/or" describes an association relationship between correlated objects, including three relationships. For example, "A and/or B" can mean A only, B only, or both A and B. Each of A and B can be a singular item or multiple items. The character "/" generally represents an "or" relationship between the correlated objects preceding and succeeding the symbol. "At least one of the following items" or similar expressions refer to any combination of these items, including a single item or any combination of a plurality of items. For example, "at least one of a, b, or c" can represent "a", "b", "c", "a and b", "a and c", "b and c", or "a, b, and c", where a, b, and c each can be a singular item or multiple items.

Those skilled in the art could be aware that, units and algorithm steps described in embodiments disclosed herein may be implemented by electronic hardware, or by a combination of computer software and electronic hardware. Whether these functions are executed by hardware or software is dependent on particular use and design constraints of the technical solutions. Professionals may adopt different methods for different particular uses to implement described functions, which should not be regarded as going beyond the scope of the present disclosure.

Those skilled in the art can clearly understand that, for convenience and conciseness of the description, specific working processes of the above systems, apparatuses, and units can be referred to corresponding processes in the above method embodiments, and thus repeated description will be omitted here.

In the embodiments provided by the present disclosure, when any of the functions is implemented in the form of the software functional unit and is sold or used as a standalone product, it can be stored in a computer-readable storage medium. Based on this understanding, all or part of the technical solutions according to the embodiments of the present disclosure, or the part thereof that contributes to the prior art, can be embodied in the form of a software product. The computer software product may be stored in a storage medium and contain instructions to enable a computer device (which may be a personal computer, a server, a network device, or the like) to perform all or part of the steps of the method described in each of the embodiments of the present disclosure. The storage medium includes various media capable of storing program codes, such as a universal serial bus (USB) flash disk, a removable hard disk, a read-only memory (ROM), a random access memory (RAM), a magnetic disk, or an optical disk.

The specific embodiments of the present disclosure have been described above. Various variants or alternatives can be easily conceived by any of those skilled in the art without departing from the technical scope of the present disclosure. These variants and alternatives are to be encompassed by the protect scope of present disclosure as defined by the claims as attached.

What is claimed is:

1. A method for controlling a brain-computer interface device, the method comprising:

obtaining, by the brain-computer interface device, electroencephalogram data of a user;

extracting a multi-modal feature from the electroencephalogram data and image data displayed by the brain-computer interface device;

obtaining a fuzzy set corresponding to the multi-modal feature based on the multi-modal feature;

obtaining a control instruction corresponding to the multi-modal feature based on the fuzzy set corresponding to the multi-modal feature; and executing the control instruction, wherein said obtaining the control instruction corresponding to the multi-modal feature based on the fuzzy set corresponding to the multi-modal feature comprises:

obtaining a relation matrix based on the fuzzy set corresponding to the multi-modal feature and a predetermined control accuracy set;

selecting a fuzzy output result from the relation matrix based on a fuzzy membership degree; and obtaining the control instruction corresponding to the multi-modal feature based on the fuzzy output result.

2. The method according to claim 1, wherein said obtaining the fuzzy set corresponding to the multi-modal feature based on the multi-modal feature comprises:

performing feature mapping on the multi-modal feature; and fuzzifying a result of the feature mapping to obtain the fuzzy set corresponding to the multi-modal feature.

3. The method according to claim 2, wherein said fuzzifying the result of the feature mapping to obtain the fuzzy set corresponding to the multi-modal feature comprises:

obtaining an Euclidean distance between the result of the feature mapping and a cluster center corresponding to the result of the feature mapping;

discretizing the Euclidean distance to obtain a discrete domain value corresponding to the Euclidean distance;

determining a control adjustment amount corresponding to the multi-modal feature based on the discrete domain value corresponding to the Euclidean distance; and obtaining the fuzzy set corresponding to the multi-modal feature based on the control adjustment amount corresponding to the multi-modal feature.

4. The method according to claim 1, wherein said extracting the multi-modal feature from the electroencephalogram data and the image data displayed by the brain-computer interface device comprises:

encoding the electroencephalogram data to obtain an electroencephalogram vector, and encoding the image data to obtain an image vector;

performing a feature transformation on the electroencephalogram vector to obtain an electroencephalogram feature vector, and performing a feature transformation on the image vector to obtain an image feature vector; and obtaining the multi-modal feature based on the electroencephalogram feature vector and the image feature vector.

5. The method according to claim 4, wherein said encoding the electroencephalogram data to obtain the electroencephalogram vector comprises:

performing a discrete wavelet transform on electroencephalogram data of each channel to obtain a two-dimensional electroencephalogram feature map of each channel, the two-dimensional electroencephalogram feature map of each channel comprising a time domain feature and a frequency domain feature of each channel;

merging obtained two-dimensional electroencephalogram feature maps to obtain a three-dimensional electroencephalogram time-frequency domain feature;

performing a feature extraction on the three-dimensional electroencephalogram time-frequency domain feature for each channel to obtain a first deep feature of each channel in a time dimension, and performing a cross-channel feature extraction on the three-dimensional electroencephalogram time-frequency domain feature to obtain a second deep feature between channels in a spatial dimension; and obtaining the electroencephalogram vector based on the first deep feature and the second deep feature.

6. The method according to claim 4, wherein:

the image data comprises local image data which is in an image displayed by the brain-computer interface device and which comprises a viewpoint of the user at a current time point; and said encoding the image data to obtain the image vector comprises:

performing an image preprocessing on the local image data to obtain a viewpoint attention image;

extracting a deep feature image from the viewpoint attention image using a base convolutional layer and a deep residual layer; and obtaining the image vector based on the deep feature image.

7. A brain-computer interface device, comprising:

one or more processors;

a memory;

a plurality of application programs; and one or more computer programs stored in the memory and comprising an instruction, the instruction, when executed by the brain-computer interface device, causing the brain-computer interface device to perform a method for controlling a brain-computer interface device, the method comprising:

obtaining electroencephalogram data of a user;

extracting a multi-modal feature from the electroencephalogram data and image data displayed by the brain-computer interface device;

obtaining a fuzzy set corresponding to the multi-modal feature based on the multi-modal feature;

obtaining a control instruction corresponding to the multi-modal feature based on the fuzzy set corresponding to the multi-modal feature; and executing the control instruction, wherein the instruction, when executed by the brain-computer interface device, causing the brain-computer interface device to perform an operation of obtaining the control instruction corresponding to the multi-modal feature based on the fuzzy set corresponding to the multi-modal feature comprises:

obtaining a relation matrix based on the fuzzy set corresponding to the multi-modal feature and a predetermined control accuracy set;

selecting a fuzzy output result from the relation matrix based on a fuzzy membership degree; and obtaining the control instruction corresponding to the multi-modal feature based on the fuzzy output result.

8. The brain-computer interface device according to claim 7, wherein the instruction, when executed by the brain-computer interface device, causing the brain-computer interface device to perform an operation of obtaining the fuzzy set corresponding to the multi-modal feature based on the multi-modal feature comprises:

performing feature mapping on the multi-modal feature; and fuzzifying a result of the feature mapping to obtain the fuzzy set corresponding to the multi-modal feature.

9. The brain-computer interface device according to claim 8, wherein the instruction, when executed by the brain-computer interface device, causing the brain-computer interface device to perform an operation of fuzzifying the result of the feature mapping to obtain the fuzzy set corresponding to the multi-modal feature comprises:

obtaining an Euclidean distance between the result of the feature mapping and a cluster center corresponding to the result of the feature mapping;

discretizing the Euclidean distance to obtain a discrete domain value corresponding to the Euclidean distance;

determining a control adjustment amount corresponding to the multi-modal feature based on the discrete domain value corresponding to the Euclidean distance; and obtaining the fuzzy set corresponding to the multi-modal feature based on the control adjustment amount corresponding to the multi-modal feature.

10. The brain-computer interface device according to claim 7, wherein the instruction, when executed by the brain-computer interface device, causing the brain-computer interface device to perform an operation of extracting the multi-modal feature from the electroencephalogram data and the image data displayed by the brain-computer interface device comprises:

encoding the electroencephalogram data to obtain an electroencephalogram vector, and encoding the image data to obtain an image vector;

performing a feature transformation on the electroencephalogram vector to obtain an electroencephalogram feature vector, and performing a feature transformation on the image vector to obtain an image feature vector; and obtaining the multi-modal feature based on the electroencephalogram feature vector and the image feature vector.

11. The brain-computer interface device according to claim 10, wherein the instruction, when executed by the brain-computer interface device, causing the brain-computer interface device to perform an operation of encoding the electroencephalogram data to obtain the electroencephalogram vector comprises:

performing a discrete wavelet transform on electroencephalogram data of each channel to obtain a two-dimensional electroencephalogram feature map of each channel, the two-dimensional electroencephalogram feature map of each channel comprising a time domain feature and a frequency domain feature of each channel;

merging obtained two-dimensional electroencephalogram feature maps to obtain a three-dimensional electroencephalogram time-frequency domain feature;

performing a feature extraction on the three-dimensional electroencephalogram time-frequency domain feature for each channel to obtain a first deep feature of each channel in a time dimension, and performing a cross-channel feature extraction on the three-dimensional electroencephalogram time-frequency domain feature to obtain a second deep feature between channels in a spatial dimension; and obtaining the electroencephalogram vector based on the first deep feature and the second deep feature.

12. The brain-computer interface device according to claim 10, wherein:

the image data comprises local image data which is in an image displayed by the brain-computer interface device and which comprises a viewpoint of the user at a current time point; and the instruction, when executed by the brain-computer interface device, causing the brain-computer interface device to perform an operation of encoding the image data to obtain the image vector comprises:

performing an image preprocessing on the local image data to obtain a viewpoint attention image;

extracting a deep feature image from the viewpoint attention image using a base convolutional layer and a deep residual layer; and obtaining the image vector based on the deep feature image.

13. A non-transient computer-readable storage medium, having a computer program stored thereon, wherein the computer program, when executed by a computer, causes the computer to perform a method for controlling a brain-computer interface device, the method comprising:

obtaining electroencephalogram data of a user;

extracting a multi-modal feature from the electroencephalogram data and image data displayed by the brain-computer interface device;

obtaining a fuzzy set corresponding to the multi-modal feature based on the multi-modal feature;

obtaining a control instruction corresponding to the multi-modal feature based on the fuzzy set corresponding to the multi-modal feature; and executing the control instruction, wherein the computer program, when executed by the computer, causing the computer to perform an operation of obtaining the control instruction corresponding to the multi-modal feature based on the fuzzy set corresponding to the multi-modal feature comprises:

obtaining a relation matrix based on the fuzzy set corresponding to the multi-modal feature and a predetermined control accuracy set;

selecting a fuzzy output result from the relation matrix based on a fuzzy membership degree; and obtaining the control instruction corresponding to the multi-modal feature based on the fuzzy output result.

14. The non-transient computer-readable storage medium according to claim 13, wherein the computer program, when executed by the computer, causing the computer to perform an operation of obtaining the fuzzy set corresponding to the multi-modal feature based on the multi-modal feature comprises:

performing feature mapping on the multi-modal feature; and fuzzifying a result of the feature mapping to obtain the fuzzy set corresponding to the multi-modal feature.

15. The non-transient computer-readable storage medium according to claim 13, wherein the computer program, when executed by the computer, causing the computer to perform an operation of extracting the multi-modal feature from the electroencephalogram data and the image data displayed by the brain-computer interface device comprises:

encoding the electroencephalogram data to obtain an electroencephalogram vector, and encoding the image data to obtain an image vector;

performing a feature transformation on the electroencephalogram vector to obtain an electroencephalogram feature vector, and performing a feature transformation on the image vector to obtain an image feature vector; and obtaining the multi-modal feature based on the electroencephalogram feature vector and the image feature vector.

16. The non-transient computer-readable storage medium according to claim 15, wherein the computer program, when executed by the computer, causing the computer to perform an operation of encoding the electroencephalogram data to obtain the electroencephalogram vector comprises:

performing a discrete wavelet transform on electroencephalogram data of each channel to obtain a two-dimensional electroencephalogram feature map of each channel, the two-dimensional electroencephalogram feature map of each channel comprising a time domain feature and a frequency domain feature of each channel;

merging obtained two-dimensional electroencephalogram feature maps to obtain a three-dimensional electroencephalogram time-frequency domain feature;

performing a feature extraction on the three-dimensional electroencephalogram time-frequency domain feature for each channel to obtain a first deep feature of each channel in a time dimension, and performing a cross-channel feature extraction on the three-dimensional electroencephalogram time-frequency domain feature to obtain a second deep feature between channels in a spatial dimension; and obtaining the electroencephalogram vector based on the first deep feature and the second deep feature.

17. The non-transient computer-readable storage medium according to claim 15, wherein:

the image data comprises local image data which is in an image displayed by the brain-computer interface device and which comprises a viewpoint of the user at a current time point; and the computer program, when executed by the computer, causing the computer to perform an operation of encoding the image data to obtain the image vector comprises:

performing an image preprocessing on the local image data to obtain a viewpoint attention image;

extracting a deep feature image from the viewpoint attention image using a base convolutional layer and a deep residual layer; and obtaining the image vector based on the deep feature image.

* * * * *